(12) United States Patent
Kitagawa et al.

(10) Patent No.: US 11,675,460 B2
(45) Date of Patent: Jun. 13, 2023

(54) IN-CELL TOUCH PANEL DEVICE AND METHOD FOR CONTROLLING IN-CELL TOUCH PANEL

(71) Applicant: Sharp Display Technology Corporation, Kameyama (JP)

(72) Inventors: Daiji Kitagawa, Kameyama (JP); Jin Miyazawa, Kameyama (JP); Yousuke Nakamura, Kameyama (JP); Daisuke Suehiro, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/948,241

(22) Filed: Sep. 20, 2022

(65) Prior Publication Data

US 2023/0104048 A1    Apr. 6, 2023

(30) Foreign Application Priority Data

Oct. 6, 2021    (JP) .............................. JP2021-164814

(51) Int. Cl.
*G06F 3/041* (2006.01)
*G09G 3/36* (2006.01)
*G06F 3/044* (2006.01)

(52) U.S. Cl.
CPC ........ *G06F 3/04186* (2019.05); *G06F 3/0412* (2013.01); *G06F 3/04166* (2019.05); *G09G 3/36* (2013.01); *G06F 3/044* (2013.01); *G06F 2203/04104* (2013.01); *G09G 2340/0435* (2013.01); *G09G 2354/00* (2013.01)

(58) Field of Classification Search
CPC ............ G06F 3/04186; G06F 3/04166; G06F 3/0412; G06F 3/044; G06F 2203/04104; G09G 3/36; G09G 2340/435; G09G 2354/00
See application file for complete search history.

(56) References Cited

U.S. PATENT DOCUMENTS

| | | | |
|---|---|---|---|
| 2014/0145985 A1 | 5/2014 | Akai et al. | |
| 2020/0105214 A1 | 4/2020 | Matsui | |
| 2020/0218424 A1* | 7/2020 | Feng | .................... G06F 3/04186 |
| 2020/0341613 A1* | 10/2020 | Gu | ...................... G06F 3/04883 |

FOREIGN PATENT DOCUMENTS

| | | |
|---|---|---|
| JP | 2014-228890 A | 12/2014 |
| JP | 6012437 B2 | 10/2016 |
| JP | 2020-052739 A | 4/2020 |

\* cited by examiner

*Primary Examiner* — Peter D McLoone
(74) *Attorney, Agent, or Firm* — ScienBiziP, P.C.

(57) ABSTRACT

A control circuit of an in-cell touch panel device associates a touch position P1 and a touch position P2 with each other when a refresh rate is F1 and a touch-to-touch distance d1 between the successive touch positions P1 and P2 is equal to or less than a determination distance D1. The control circuit associates a touch position P3 and a touch position P4 with each other when a touch-to-touch distance d2 between the touch position P3 detected last in a period in which the refresh rate is F2 lower than F1 and the touch position P4 detected first since a period in which the refresh rate is F1 starts is equal to or less than a determination distance D2 greater than the determination distance D1.

5 Claims, 17 Drawing Sheets

IN-CELL TOUCH PANEL DEVICE AND METHOD FOR CONTROLLING IN-CELL TOUCH PANEL

CROSS-REFERENCE TO RELATED APPLICATIONS

This application claims the benefit of priority to Japanese Patent Application Number 2021-164814 filed on Oct. 6, 2021. The entire contents of the above-identified application are hereby incorporated by reference.

BACKGROUND

Technical Field

The disclosure relates to an in-cell touch panel device and a method for controlling an in-cell touch panel.

Typically, a touch panel device that detects a touch position of a finger is known. Such a touch panel device is disclosed in, for example, JP 6012437 B.

The touch panel device in JP 6012437 B described above includes a mutual capacitive touch panel, a touch panel controller that controls the touch panel, and a subprocessor. The subprocessor switches the touch panel device between a sleep state where touch detection by the touch panel is not performed, and an active state where the touch detection by the touch panel is performed. Further, the subprocessor periodically switches the touch panel device to the active state after the touch panel device enters the sleep state. In this way, the touch detection can be periodically performed while reducing power consumption as compared to a case where the touch panel device is always in the active state.

Further, typically, an in-cell touch panel device including an in-cell touch panel that performs both of display of an image and detection of a touch position is known. Such an in-cell touch panel determines that two successive touches are those by the same pointer when a distance between two successive touch positions is equal to or less than a predetermined determination distance.

Summary

Here, also in the in-cell touch panel, it is conceivable that processing of reducing a refresh rate of display of an image (processing of setting to a sleep state) can be performed in order to reduce power consumption when the in-cell touch panel is not touched within a predetermined period.

However, since the display of an image and the touch detection are performed in a time division manner in the in-cell touch panel, a report rate of the touch detection (a cycle of performing the touch detection) needs to match the refresh rate of the display of an image. Thus, when the refresh rate decreases, the report rate of the touch detection also decreases. As a result, in a case where the refresh rate is changed from a low state to a high state while a pointer is moving and touching the in-cell touch panel, immediately after the change, a touch position detected in a state where the refresh rate is low (a state where a cycle of the touch detection is long) is detected as a position away from the currently detected touch position. In this way, there is a problem that a distance between the two successive touch positions is greater than the predetermined determination distance, and the currently detected touch position is mistakenly determined to be the position of a touch by a pointer different from the pointer having previously touched the in-cell touch panel.

Thus, the disclosure is made in order to solve the problem described above, and an object thereof is to provide an in-cell touch panel device and a method for controlling an in-cell touch panel that allow appropriate detection of successive touches even before and after a change of a refresh rate from a low state to a high state.

In order to solve the problem described above, an in-cell touch panel device according to a first aspect of the disclosure includes: an in-cell touch panel configured to perform display of an image and detection of a touch position in a time division manner; and a control circuit configured to control the in-cell touch panel, in which the control circuit is configured to change a refresh rate of the in-cell touch panel between a first rate and a second rate lower than the first rate, and the control circuit is further configured to cause the in-cell touch panel to perform detection of a touch position in a first cycle when the refresh rate is the first rate, cause the in-cell touch panel to perform detection of a touch position in a second cycle being a cycle longer than the first cycle at the end at least within one frame period, when the refresh rate is the second rate, associate a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle, and associate a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate.

Further, a method for controlling an in-cell touch panel according to a second aspect is a method for controlling an in-cell touch panel configured to perform display of an image and detection of a touch position in a time division manner, and includes: changing a refresh rate of the in-cell touch panel between a first rate and a second rate lower than the first rate; causing the in-cell touch panel to perform detection of a touch position in a first cycle when the refresh rate is the first rate; causing the in-cell touch panel to perform detection of a touch position in a second cycle being a cycle longer than the first cycle at the end at least within one frame period, when the refresh rate is the second rate; associating a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle; and associating a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate.

The in-cell touch panel device having the configuration described above and the method for controlling an in-cell touch panel allow appropriate detection of successive touches even before and after a change of a refresh rate from a second rate to a first rate higher than the second rate.

BRIEF DESCRIPTION OF DRAWINGS

The disclosure will be described with reference to the accompanying drawings, wherein like numbers reference like elements.

DESCRIPTION OF EMBODIMENTS

Figure 1:
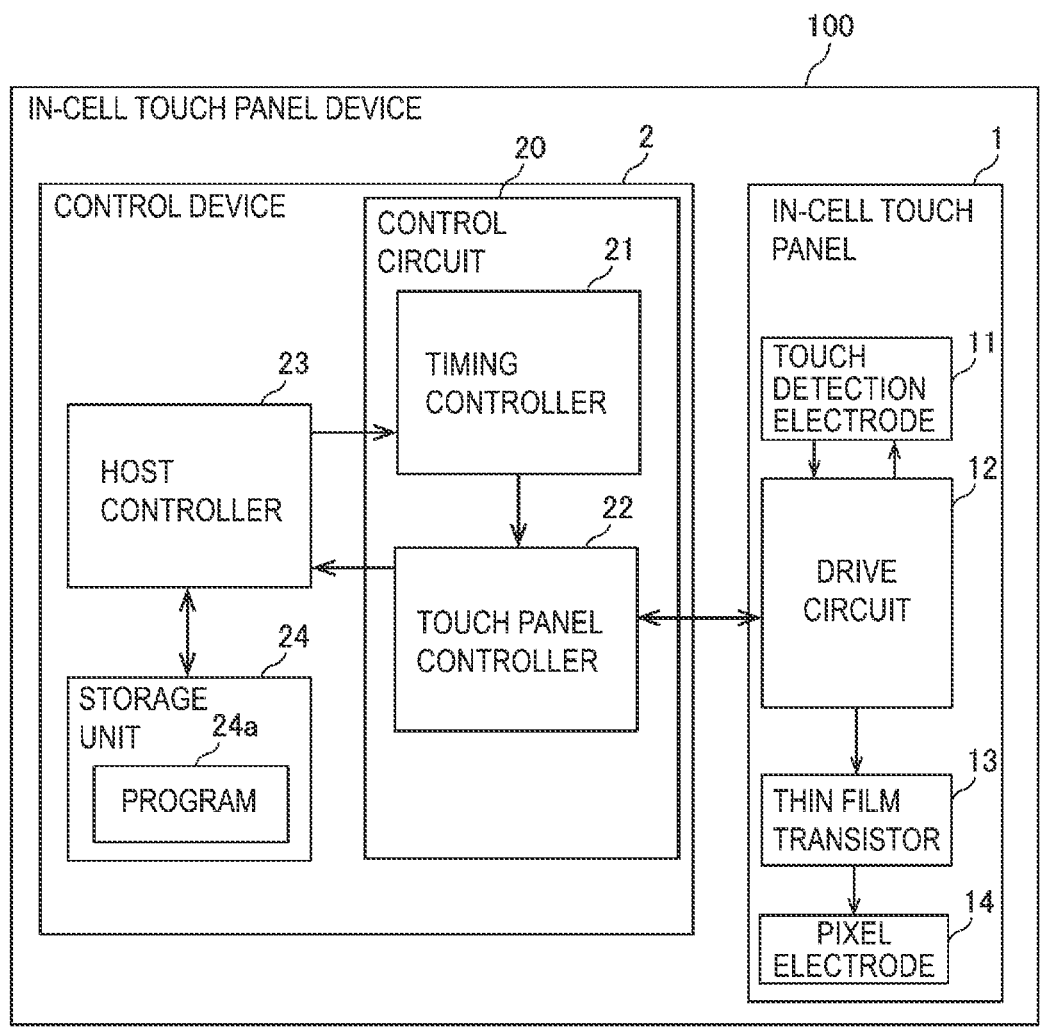
FIG. 1 is a block diagram illustrating a configuration of an in-cell touch panel device 100 according to an embodiment.

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

Configuration of In-Cell Touch Panel Device

Figure 2:
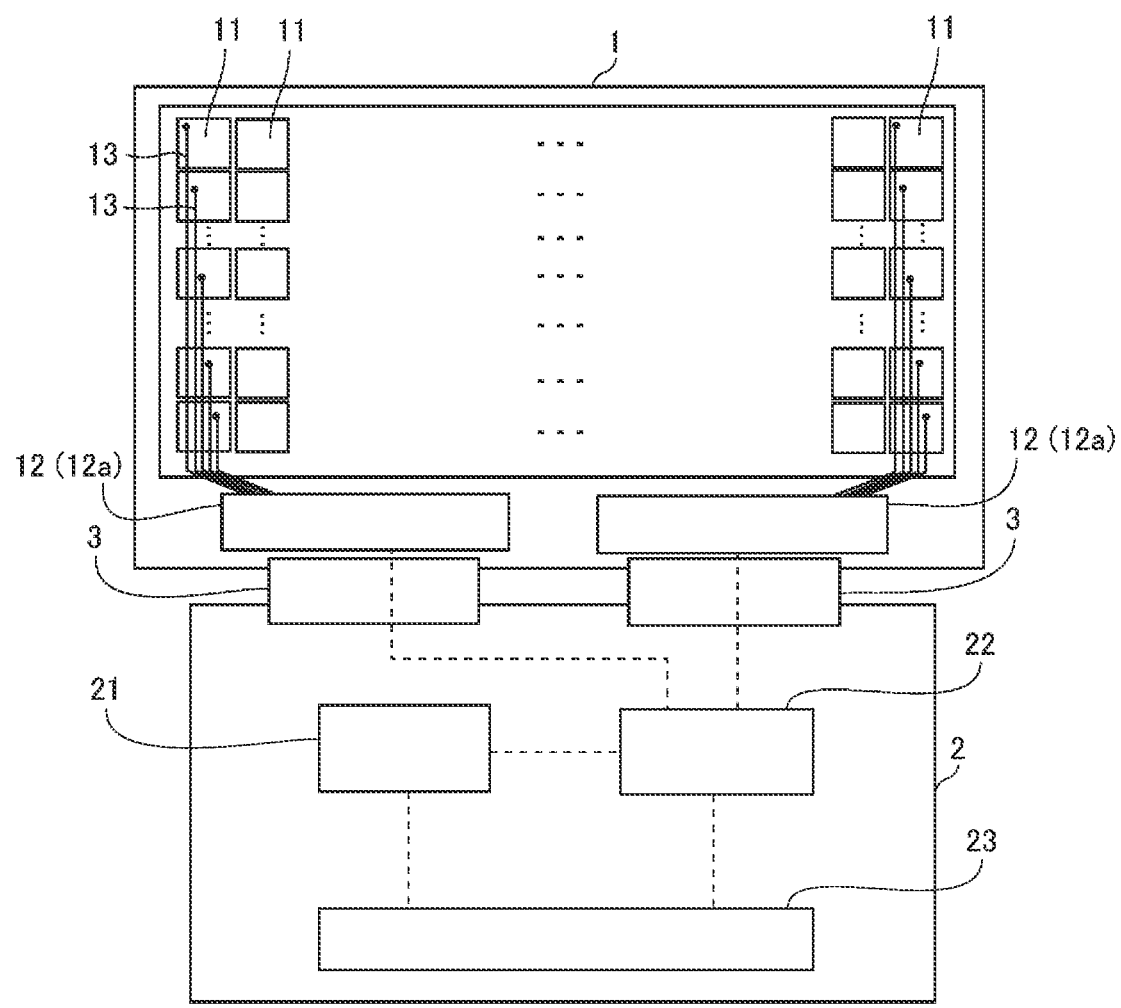
FIG. 2 is a schematic view for describing a connection relationship between an in-cell touch panel 1 and a control device 2.

A configuration of an in-cell touch panel device 100 according to the present embodiment will be described. FIG. 1 is a block diagram illustrating the configuration of the in-cell touch panel device 100 according to the present embodiment. FIG. 2 is a schematic view for describing a connection relationship between an in-cell touch panel 1 and a control device 2.

As illustrated in FIG. 1, the in-cell touch panel device 100 includes the in-cell touch panel 1 and the control device 2. The in-cell touch panel device 100 is a display device having a touch detection function. For example, the in-cell touch panel device 100 is disposed in a smartphone, a tablet terminal, a personal computer, and the like. As illustrated in FIG. 2, the in-cell touch panel 1 and the control device 2 are connected to each other via a flexible printed circuit board 3.

Configuration of In-Cell Touch Panel

The in-cell touch panel 1 detects coordinates (hereinafter referred to as a "touch position") of a position touched by a pointer such as a finger and a pen, and also displays a video or an image. The in-cell touch panel 1 is, for example, a self-capacitive touch panel.

As illustrated in FIG. 2, the in-cell touch panel 1 includes a plurality of touch detection electrodes 11, a plurality of drive circuits 12, and a plurality of touch detection lines 13. The plurality of touch detection electrodes 11 are disposed in matrix, for example. Then, each of the plurality of touch detection electrodes 11 is connected to any one of the plurality of drive circuits 12 via the touch detection line 13.

Figure 3:
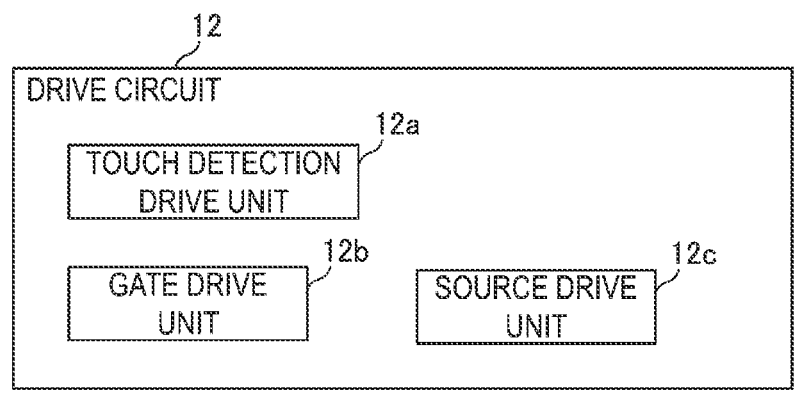
FIG. 3 is a functional block diagram of a drive circuit 12.

FIG. 3 is a functional block diagram of the drive circuit 12. The drive circuit 12 includes a touch detection electrode drive unit 12a, a gate drive unit 12b, and a source drive unit 12c. The touch detection electrode drive unit 12a of the drive circuit 12 supplies a drive signal to the touch detection electrode 11. The drive signal has a waveform changing according to a capacitance between a pointer and the touch detection electrode 11. The touch detection electrode drive unit 12a acquires a detection signal being the drive signal having the changed waveform from the touch detection electrode 11, and detects a touch position by the pointer, based on the detection signal. The touch detection electrode drive unit 12a outputs the touch position to the control device 2 (see FIG. 2). Note that, in FIG. 3, the touch detection electrode drive unit 12a, the gate drive unit 12b, and the source drive unit 12c are described as functional blocks in the drive circuit 12, but the touch detection electrode drive unit 12a, the gate drive unit 12b, and the source drive unit 12c may be formed in separate integrated circuits.

Figure 4:
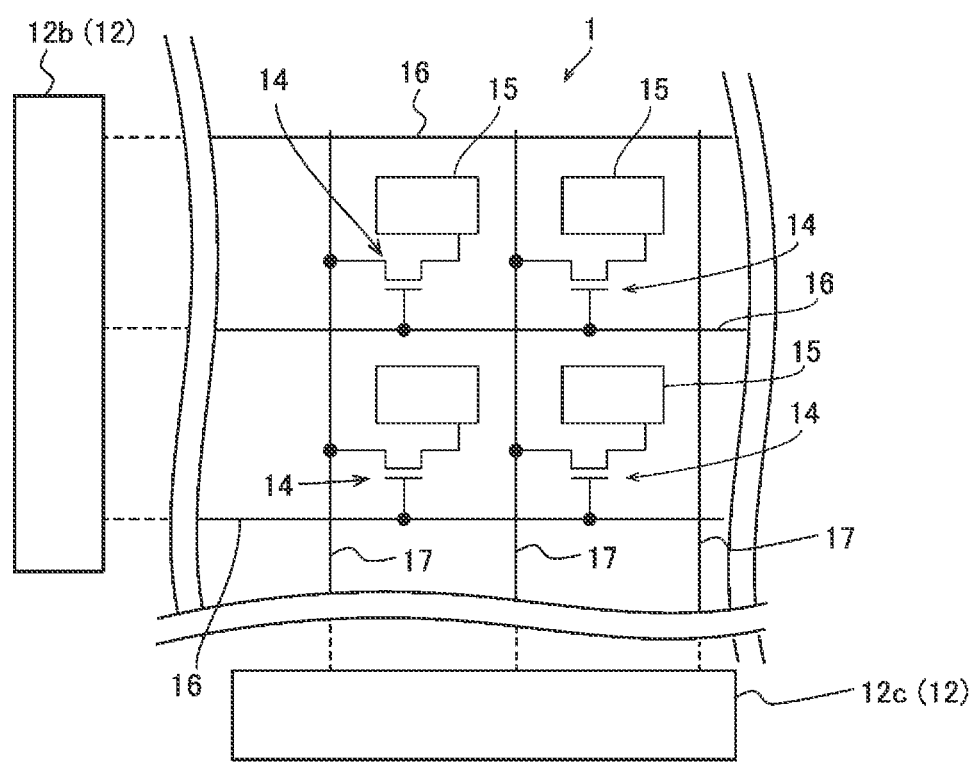
FIG. 4 is a diagram for describing a connection relationship between a plurality of thin film transistors 14 and a plurality of pixel electrodes 15, and the drive circuit 12.

FIG. 4 is a diagram for describing a connection relationship between a plurality of thin film transistors 14 and a plurality of pixel electrodes 15, and the drive circuit 12. As illustrated in FIG. 4, the in-cell touch panel 1 includes the plurality of thin film transistors 14 and the plurality of pixel electrodes 15. The gate drive unit 12b is connected to a gate line 16. The source drive unit 12c of the drive circuit 12 is connected to a source line 17. A gate electrode of the thin film transistor 14 is connected to the gate line 16, and a source electrode of the thin film transistor 14 is connected to the source line 17. Further, a drain electrode of the thin film transistor 14 is connected to the pixel electrode 15. Further, the pixel electrode 15 forms an electrostatic capacitance with the touch detection electrode 11. The touch detection electrode 11 is a common electrode commonly provided to the plurality of pixel electrodes 15.

The gate drive unit 12b of the drive circuit 12 sequentially supplies a gate signal (scanning signal) to each of the plurality of gate lines 16 in a period DP (see FIG. 5) for displaying an image described below. Further, the source drive unit 12c of the drive circuit 12 supplies a source signal based on an image signal to each of the plurality of source lines 17. In this way, when the thin film transistor 14 supplied with the gate signal is turned on the source signal is written in the pixel electrode 15. Then, in the in-cell touch panel 1, an electrical field generated by the pixel electrode 15 and the touch detection electrode 11 (common electrode) drives a liquid crystal layer (not illustrated) to display an image.

Configuration of Control Device

The control device 2 is a device that controls the in-cell touch panel 1. As illustrated in FIG. 1, the control device 2 includes a control circuit 20 including a timing controller 21 and a touch panel controller 22, a host controller 23, and a storage unit 24. The control circuit 20 and the host controller 23 are connected by, for example, an I²C bus; this configuration makes it possible to perform serial communication therebetween. The storage unit 24 is a read only memory (ROM) or a non-volatile memory such as a flash memory, for example, and stores a program 24a.

Figure 5:
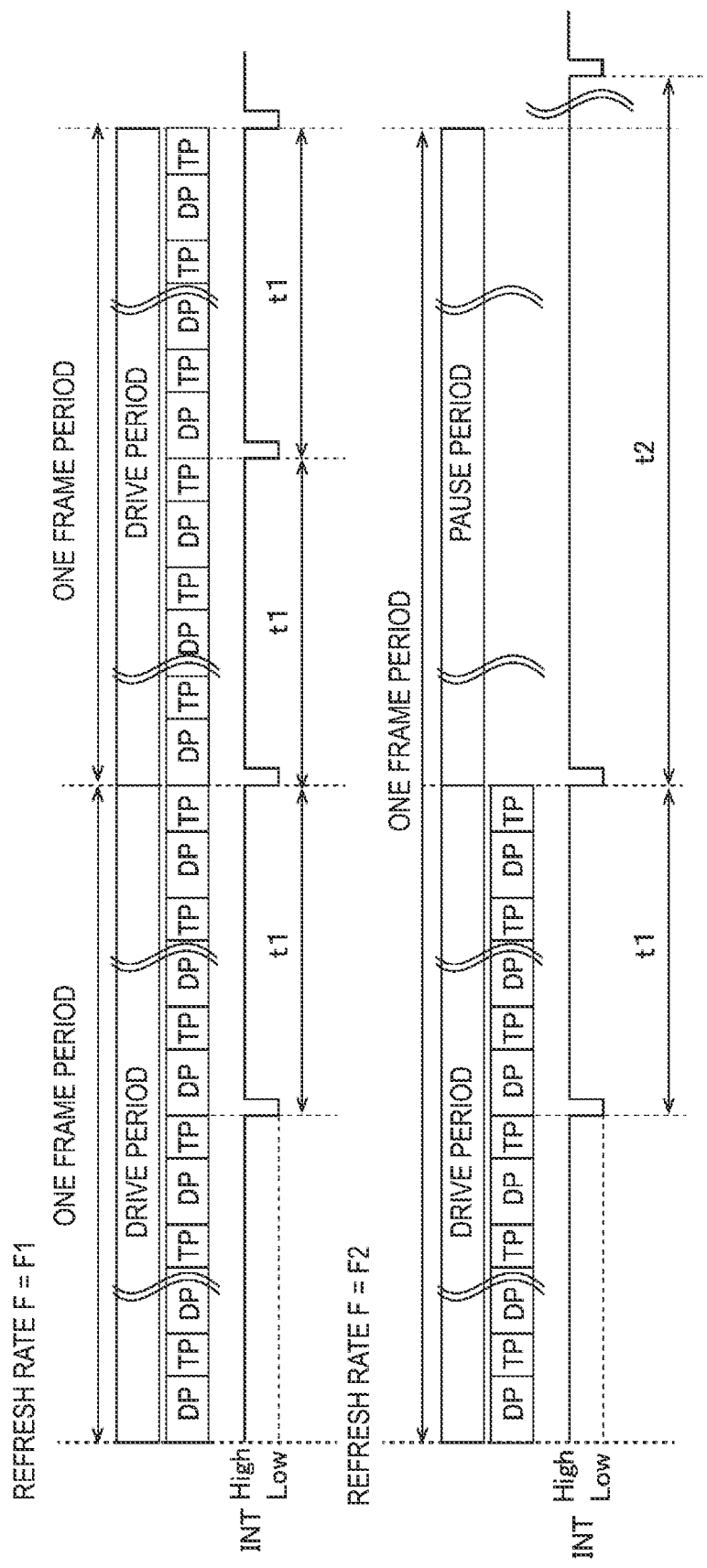
FIG. 5 is a diagram for describing a relationship between a period DP for displaying an image and a period TP for performing detection of a touch position.

FIG. 5 is a diagram for describing a relationship between the period DP for displaying an image and a period TP for performing detection of a touch position. By transmitting a timing signal to the touch panel controller 22 in a regular cycle, the timing controller 21 causes the touch panel controller 22 to perform display of an image on the in-cell touch panel 1 and detection of a touch position by the in-cell touch panel 1 in a time division manner. As illustrated in FIG. 5, the timing controller 21 transmits the timing signal to the touch panel controller 22 such that the period DP for displaying an image on the in-cell touch panel 1 and the period TP for detecting a touch position by the in-cell touch panel 1 alternate. The timing controller 21 makes the period DP and the period TP repeat a plurality of times per one frame period.

As illustrated in FIG. 2, the touch panel controller 22 is connected to the plurality of drive circuits 12. The touch panel controller 22 controls detection of a touch position on the in-cell touch panel 1 via the touch detection electrode drive unit 12a of each of the plurality of drive circuits 12. For example, as illustrated in FIG. 5, the touch panel controller 22 supplies the drive signal to some of the plurality of touch detection electrodes 11 of the in-cell touch panel 1 in the period TP. Further, the touch panel controller 22 receives the detection signal from the touch detection electrode 11 supplied with the drive signal. Then, the touch panel controller 22 performs supply of the drive signal and reception of the detection signal for each period TP, and processes the detection signals (magnitude of a capacitance) such that MAP-like data is configured, after receiving the detection signal from all of the touch detection electrodes 11. Then, the touch panel controller 22 performs processing such as calculation of the center of gravity from the MAP-like data, and generates a touch coordinate report including information about coordinates (touch position) of a position touched by a pointer. Then, the touch panel controller 22 transmits the touch coordinate report to the host controller 23. Further, the touch panel controller 22 transmits, to the host controller 23, a signal INT indicating that generation of the touch coordinate report is completed. For example, as illustrated in FIG. 5, the touch panel controller 22 switches a level of the signal INT from a state of "High" to a state of "Low" when generation of the touch coordinate report is completed. In the example illustrated in FIG. 5, the touch panel controller 22 transmits the touch coordinate report to the host controller 23 twice per one frame period, but the disclosure is not limited to twice, and may be once, or three or more times.

Figure 6A:
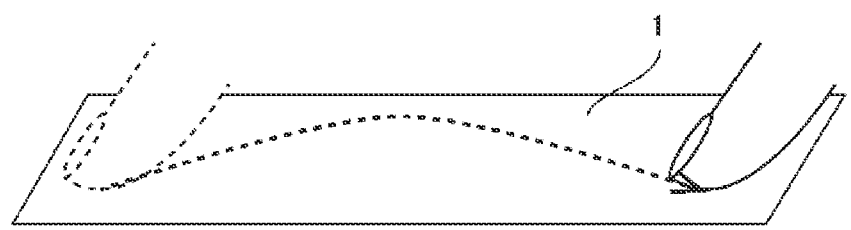
FIG. 6A is a diagram schematically illustrating a state where a pointer touches the in-cell touch panel 1.
Figure 6B:
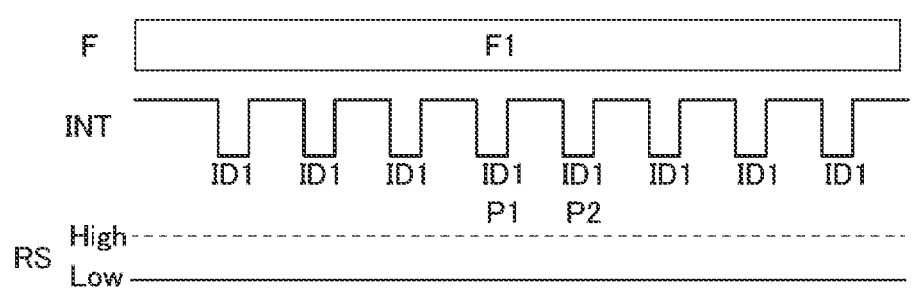
FIG. 6B is a diagram for describing a first example of provision of identification information.
Figure 6C:
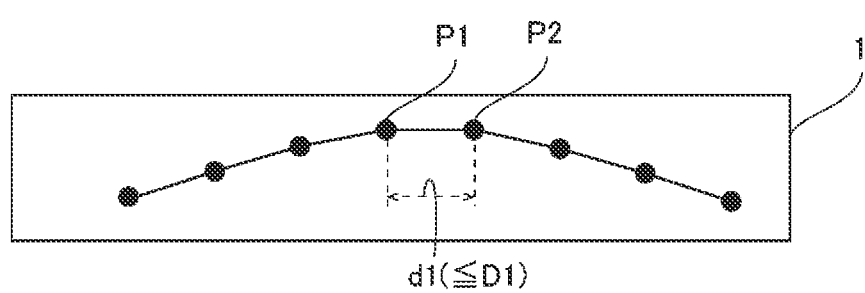
FIG. 6C is a diagram illustrating a first example of display on the in-cell touch panel 1.

FIG. 6A is a diagram schematically illustrating a state where a pointer touches the in-cell touch panel 1. FIG. 6B is a diagram for describing a first example of provision of identification information. FIG. 6C is a diagram illustrating a first example of display on the in-cell touch panel 1. When the pointer moves while touching the in-cell touch panel 1 as illustrated in FIG. 6A, the touch panel controller 22 provides identification information (hereinafter referred to as "ID") to each of a plurality of detected touch positions as illustrated in FIG. 6B. Here, as illustrated in FIG. 6C, when a refresh rate F of the in-cell touch panel 1 is F1 (first rate), the touch panel controller 22 compares a touch-to-touch distance d1 being a distance between two successive touch positions P1 and P2 with a determination distance D1. Then, when the touch-to-touch distance d1 between the two successive touch positions P1 and P2 is equal to or less than the determination distance D1, the touch panel controller 22 provides the same ID to the two successive touch positions P1 and P2. In the example in FIG. 6B, the same "ID1" is provided to all touch positions. Then, the touch coordinate report includes the touch positions provided with the IDs.

Figure 7A:
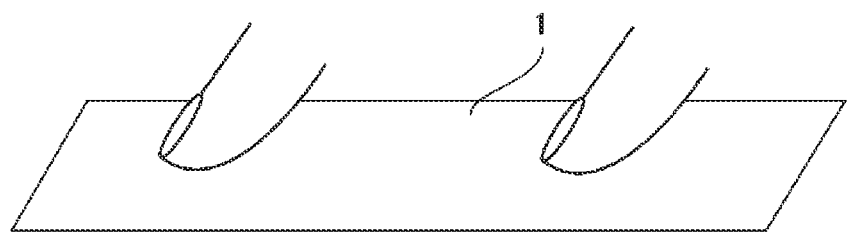
FIG. 7A is a diagram schematically illustrating a state where two pointers touch the in-cell touch panel 1.
Figure 7B:
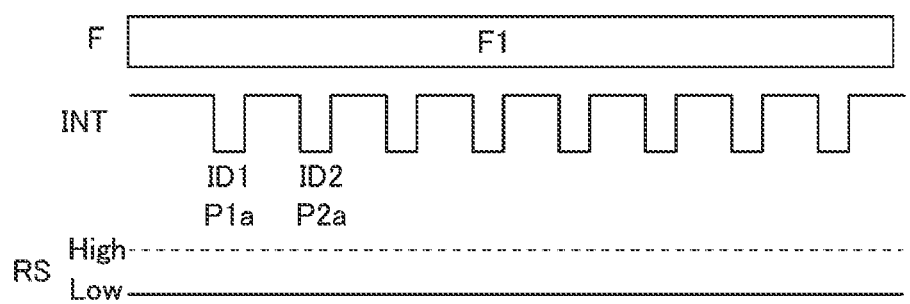
FIG. 7B is a diagram for describing a second example of provision of identification information.
Figure 7C:
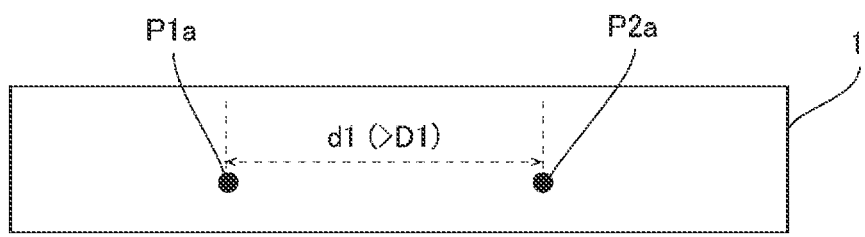
FIG. 7C is a diagram illustrating a second example of display on the in-cell touch panel 1.

FIG. 7A is a diagram schematically illustrating a state where two pointers touch the in-cell touch panel 1. FIG. 7B is a diagram for describing a second example of provision of ID. FIG. 7C is a diagram illustrating a second example of display on the in-cell touch panel 1. When the two pointers (for example, two fingers) sequentially touch a portion on a left side and a portion on a right side of the in-cell touch panel 1, respectively, as illustrated in FIG. 7A, the touch panel controller 22 provides ID to each of a plurality of detected touch positions P1a and P2a as illustrated in FIG. 7B. Here, in a case of the example in FIG. 7C, the touch-to-touch distance d1 is greater than the determination distance D1, and thus the touch panel controller 22 provides different IDs to the two touch positions P1a and P2a as illustrated in FIG. 7B. For example, "ID1" and "ID2" are provided to the two touch positions P1a and P2a, respectively. Then, the touch coordinate report includes the touch positions provided with the IDs.

The host controller 23 controls the in-cell touch panel device 100 by executing the program 24a stored in the storage unit 24 illustrated in FIG. 1. Further, the host controller 23 transmits a broadcast signal or a display signal acquired from a storage medium or a video playback device (not illustrated) to the timing controller 21. The display signal includes information about a magnitude of the refresh rate F (information indicating whether the refresh rate F is F1 or F2).

Further, the host controller 23 determines the refresh rate F. In the present embodiment, the host controller 23 changes the refresh rate F between F1 and F2 (second rate) lower than F1. For example, the host controller 23 sets the refresh rate F of the in-cell touch panel 1 to F1. Then, the host controller 23 changes the refresh rate F of the in-cell touch panel 1 from F1 to F2 lower than F1 when a touch by a pointer is not detected in the in-cell touch panel 1 for a predetermined period (for example, for several minutes). For example, when the refresh rate F is set to F2, as illustrated in FIG. 5, a pause period in which both of the period DP (period for displaying an image) and the period TP (period for detecting a touch position) are not provided is added to a drive period in which the period DP and the period TP are provided. In this way, one frame period is extended. The example in FIG. 5 illustrates the example in which one frame period becomes twice accordingly when the refresh rate F is changed from F1 to F2, but one frame period may have a length other than twice. Note that a state where the refresh rate F is F2 is the sleep state where power consumption is reduced, and the power consumption is reduced by providing the pause period in the in-cell touch panel device 100.

Further, F1 is a value of the highest refresh rate that the in-cell touch panel 1 can take. As illustrated in FIG. 5, the pause period is not provided within one frame period. When the refresh rate F is F1, a cycle in which the touch coordinate report is output according to F1 is always t1. Further, when the refresh rate F is F2, a cycle in which the touch coordinate report is output is t1 within the drive period, and, when a cycle in which the touch coordinate report is output enters the pause period, the cycle in which the touch coordinate report is output is t2 (see FIG. 8A) longer than t1. In other words, when the refresh rate F is F2, the control circuit 20 causes the in-cell touch panel 1 to perform detection of a touch position in the cycle t2 being a cycle longer than the cycle t1, at the end within one frame period.

Figure 8A:
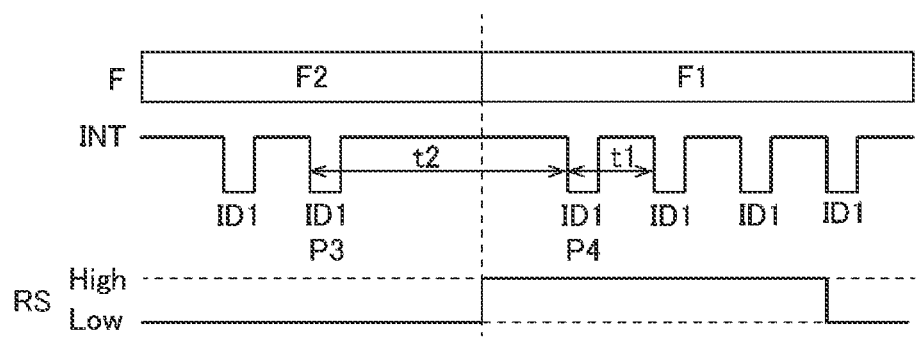
FIG. 8A is a diagram illustrating a waveform of a signal INT and a waveform of a rate change notification signal RS when a refresh rate F is changed from F2 to F1.
Figure 8B:
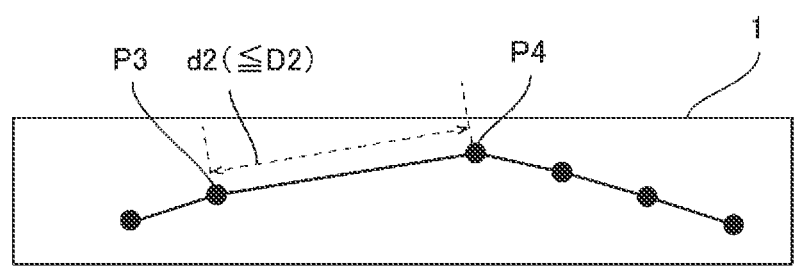
FIG. 8B is a diagram illustrating an example of display of the in-cell touch panel 1 when the refresh rate F is changed from F2 to F1.

FIG. 8A is a diagram illustrating a waveform of the signal INT and a waveform of a rate change notification signal RS when the refresh rate F is changed from F2 to F1. FIG. 8B is a diagram illustrating an example of display of the in-cell touch panel 1 when the refresh rate F is changed from F2 to F1. As illustrated in FIG. 8A, when the refresh rate F is F2, the host controller 23 changes the refresh rate F of the in-cell touch panel 1 from F2 to F1 in response to detection of a touch by a pointer on the in-cell touch panel 1. In this way, the refresh rate F can be increased to F1 as necessary while reducing power consumption by setting the refresh rate F to F2. Note that after the frame period at a time point of the touch ends, the refresh rate is changed from F2 to F1 from a next frame period.

Here, the program 24a illustrated in FIG. 1 includes, for example, drawing software (paint software). The host controller 23 makes a point corresponding to a touch position be displayed on the in-cell touch panel 1. Here, as illustrated in FIG. 6C, by the host controller 23, a line connecting points corresponding to the touch positions P1 and P2 provided with the same ID (for example, "ID1") is made to be displayed on the in-cell touch panel 1. Further, as illustrated in FIG. 7C, the host controller 23 does not allow display of a line connecting points corresponding to the plurality of touch positions P1a and P2a provided with the different IDs.

Figure 9A:
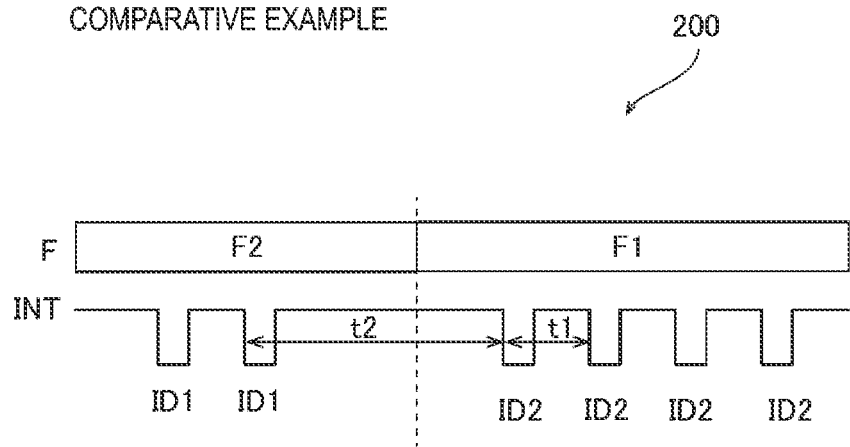
FIG. 9A is a diagram for describing an operation of an in-cell touch panel device 200 according to a comparative example.
Figure 9B:
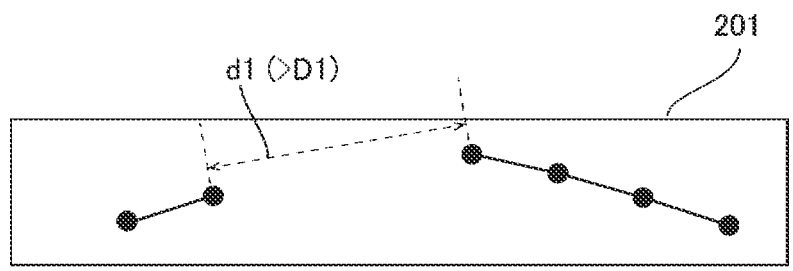
FIG. 9B is a diagram illustrating an example displayed on an in-cell touch panel 201 of the in-cell touch panel device 200 according to the comparative example.

FIG. 9A is a diagram for describing an operation of an in-cell touch panel device 200 according to a comparative example. FIG. 9B is a diagram illustrating an example displayed on an in-cell touch panel 201 of the in-cell touch panel device 200 according to the comparative example. FIG. 9A illustrates an example in which a touch by a pointer is detected when the refresh rate F is F2, and the refresh rate F is changed from F2 to F1.

In the in-cell touch panel device 200 according to the comparative example, regardless of the magnitude of the refresh rate F, the touch-to-touch distance d1 being a distance between two successive touch positions is compared with the determination distance D1. In this case, as illustrated in FIG. 9A, when the refresh rate F is switched from F2 to F1, a period in which the touch coordinate report is not acquired is extended to t2. Thus, even when the in-cell touch panel 201 is successively touched by a pointer, the touch-to-touch distance d1 between a last touch position in a period in which the refresh rate F is F2 and a first touch position in a period in which the refresh rate F is F1 increases as illustrated in FIG. 9B. As a result, the last touch position in the period in which the refresh rate F is F2 is provided with a different ID (for example, "ID2") from that of the first touch position in a period in which the refresh rate F is F1. In this way, in the in-cell touch panel device 200 according to the comparative example, the touch position successively touched by the pointer is mistakenly provided with the different ID. As a result, as illustrated in FIG. 9B, a line is broken and displayed in display on the in-cell touch panel 201 by the paint software.

In contrast, as illustrated in FIGS. 8A and 8B, in the in-cell touch panel device 100 according to the present embodiment, when a touch-to-touch distance d2 between a touch position P3 detected last in the period in which the refresh rate F is F2 and a touch position P4 detected first since the period in which the refresh rate F is F1 starts is equal to or less than a determination distance D2 greater than the determination distance D1, the same ID is provided to the touch positions P3 and P4. Further, when the touch-to-touch distance d2 is greater than the determination distance D2, different IDs are provided to the touch positions P3 and P4. In this way, even when the touch-to-touch distance d2 is greater than the determination distance D1, whether the same ID needs to be provided to the touch positions P3 and P4 is appropriately determined based on the determination distance D2. As a result, as illustrated in FIG. 8B, when the touch-to-touch distance d2 is equal to or less than the determination distance D2, a line connecting the touch positions P3 and P4 is displayed in display on the in-cell touch panel 1 by the paint software.

Specifically, the timing controller 21 detects whether the refresh rate F is F1 or F2 from the display signal received from the host controller 23. Then, in response to the change of the detected refresh rate F from F2 to F1, the timing controller 21 transmits the rate change notification signal RS indicating the change of the refresh rate F to the touch panel controller 22 as illustrated in FIG. 8A. "Transmitting the rate change notification signal RS" indicates a change in level of the rate change notification signal RS from "Low" to "High", for example. According to the configuration, even when the host controller 23 outside the control circuit 20 has a function of changing the refresh rate F, the control circuit 20 can detect a change of the refresh rate F. Further, the touch panel controller 22 changes the determination distance from D1 to D2 in response to reception of the rate change notification signal RS (change to "High"), and returns the determination distance to D1 after a determination of the touch-to-touch distance d2 based on the determination distance D2 is performed.

Here, as illustrated in FIG. 8A, when the refresh rate F is F2, the host controller 23 changes the refresh rate F of the in-cell touch panel 1 to F1 from a frame after a frame in which a touch by a pointer on the in-cell touch panel 1 is detected. In this way, in the present embodiment, when a touch is performed in a state where the refresh rate F is F2, the pause period occurs only once after the touch. As a result, as described above, by setting the determination distance to D2 only in determination of the touch-to-touch distance d2, the touch positions P3 and P4 can be associated with each other (no line displayed on the in-cell touch panel 1 is broken).

Note that, in the disclosure, the refresh rate F may be changed to F1 from a frame later than a frame after a frame in which a touch is detected. Even in this case, the timing controller 21 continues to transmit the rate change notification signal RS from a time point at which the touch is detected until the refresh rate F becomes F1. Thus, even when a frame in which the refresh rate F is F2 is repeated and the pause period occurs twice or more, the determination distance is set to D2, based on the rate change notification signal RS, and thus successive touches can be appropriately detected (no line displayed on the in-cell touch panel 1 is broken).

Further, in a case where the refresh rate F is F1, when the determination distance is always set to D2, a determination distance is greater than D1 optimal as the determination distance of the successive touch-to-touch distance d1. In this case, for example, touches by two pointers illustrated in FIGS. 7A to 7C may be mistakenly detected as successive touches (a line may be mistakenly connected). In contrast, in the present embodiment, after determination of the touch-to-touch distance d2 by the determination distance D2 is performed once, the determination distance is returned to the optimal D1, and thus a false determination described above can be prevented.

Method for Controlling In-Cell Touch Panel According to Present Embodiment

Figure 10:
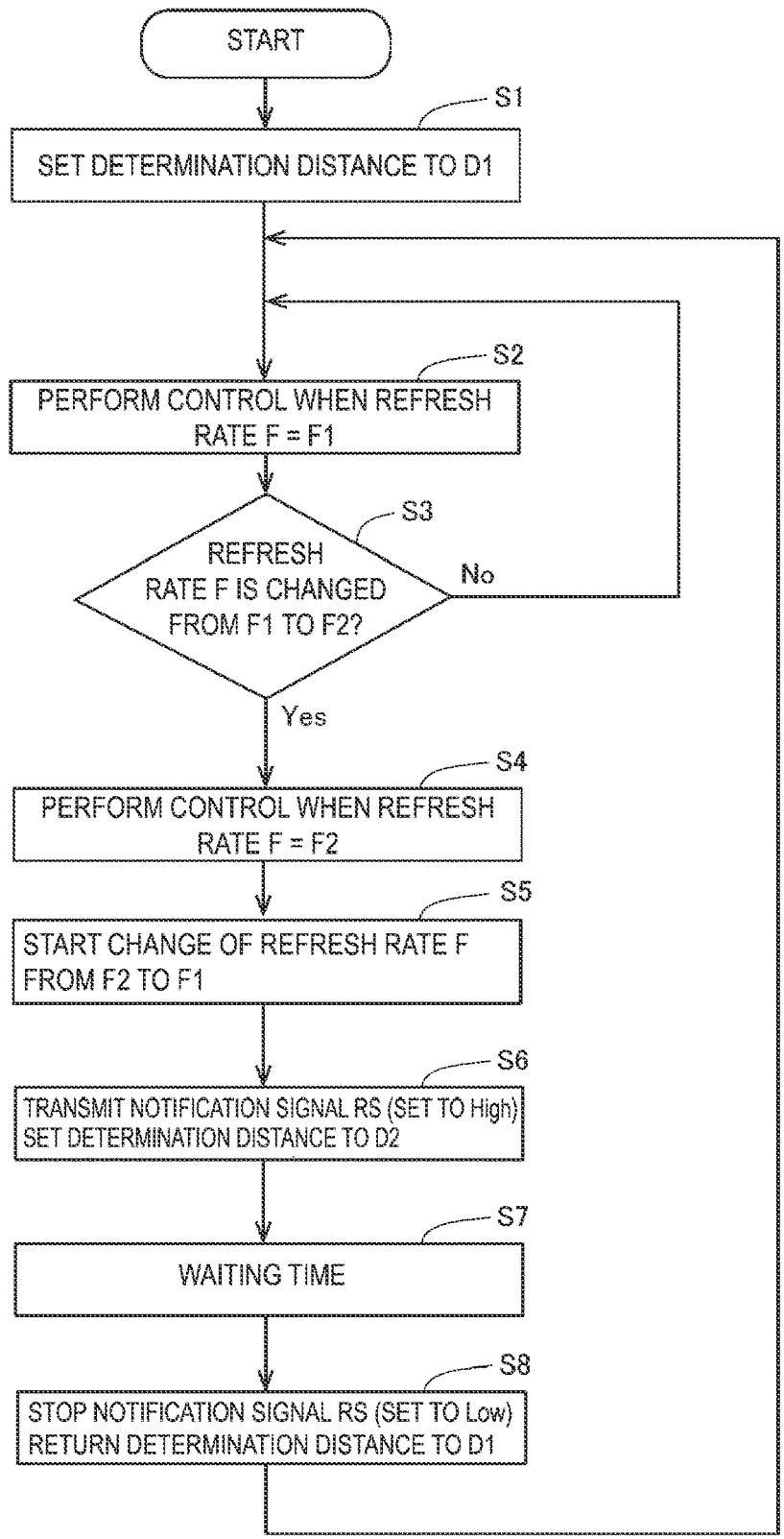
FIG. 10 is a flowchart for describing control processing of a control circuit 20 according to an embodiment.

Next, with reference to FIG. 10, a method for controlling the in-cell touch panel 1 according to the present embodiment will be described. FIG. 10 is a flowchart for describing control processing of the control circuit 20 and the host controller 23 according to the present embodiment.

As illustrated in FIG. 10, in step S1, the touch panel controller 22 sets, to D1, a determination distance for determining whether the same ID is provided to touch positions having the touch-to-touch distance d1.

In step S2, control when the refresh rate F is F1 is performed. For example, as illustrated in FIG. 5, the period DP for display of an image and the period TP for detection of a touch position are alternately performed within one frame period in a time division manner. Further, detection of a touch position is performed in each cycle t1. Then, as illustrated in FIGS. 6A to 6C, when the touch-to-touch distance d1 between the successively detected touch positions P1 and P2 is equal to or less than the determination distance D1, the same ID is provided to the touch positions P1 and P2. In this way, the touch positions P1 and P2 are associated with each other. Further, as illustrated in FIGS. 7A to 7C, when the touch-to-touch distance d1 between the successively detected touch positions P1a and P2a is greater than the determination distance D1, different IDs are provided to the touch positions P1a and P2a.

In step S3, whether the refresh rate F is changed from F1 to F2 is determined. In the present embodiment, whether the refresh rate F is changed from F1 to F2 is determined based on a signal transmitted from the host controller 23 to the control circuit 20. When the refresh rate F is changed from F1 to F2, the processing proceeds to step S4, and, when the refresh rate F is not changed from F1 to F2, the processing returns to step S2.

In step S4, control when the refresh rate F is F2 is performed. For example, as illustrated in FIG. 5, the drive period in which the period DP for display of an image and the period TP for detection of a touch position are alternately performed in a time division manner and the pause period in which neither display of an image nor detection of a touch position is performed are provided within one frame period.

In step S5, processing of changing the refresh rate F from F2 to F1 by the host controller 23 starts. For example, step S5 is performed in response to detection of a touch by a pointer. Further, in this step, a change of the refresh rate F from F2 to F1 is detected by the timing controller 21.

In step S6, the rate change notification signal RS (High state) is transmitted from the timing controller 21 to the touch panel controller 22. Then, in this step, the determination distance is set to D2 by the touch panel controller 22. Further, when the step is performed (during step S6 or a period before or after step S6), the change of the refresh rate F from F2 to F1 by the host controller 23 is completed.

Then, in step S7, predetermined waiting time is provided. The processing proceeds to next step S8 after the predetermined waiting time elapses. In this way, a first touch position since the refresh rate F becomes F1 can be reliably acquired. Then, as illustrated in FIGS. 8A and 8B, when the touch-to-touch distance d2 between the touch position P3 detected last in the period in which the refresh rate F is F2 and the touch position P4 detected first in the period in which the refresh rate F is F1 is equal to or less than the determination distance D2, the same ID is provided to the touch positions P3 and P4. As a result, the touch positions P3 and P4 are associated with each other. Further, when the touch-to-touch distance d2 is greater than the determination distance D2, different IDs are provided to the touch positions P3 and P4. According to the control method described above, even when the refresh rate F is changed from F2 to F1, successive touches before and after the change can be appropriately detected.

In step S8, the rate change notification signal RS is stopped (changed to a Low state). Accordingly, the determination distance is set to D1 (returned to D1) by the touch panel controller 22. Further, subsequently, the processing returns to step S2.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

Figure 11:
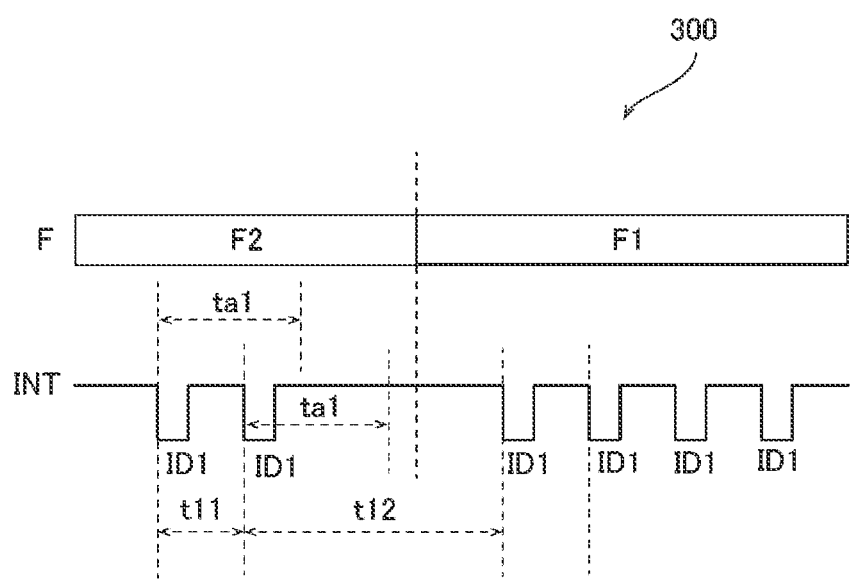
FIG. 11 is a diagram for describing a configuration of an in-cell touch panel device 300 according to a modified example of an embodiment.

(1) The embodiment described above exemplifies the example in which the touch panel controller 22 changes the determination distance from D1 to D2 in response to reception of the rate change notification signal RS, but the disclosure is not limited thereto. For example, as in an in-cell touch panel device 300 according to a modified example illustrated in FIG. 11, a touch panel controller may be configured to change the determination distance from D1 to D2 by comparing, with a determination period ta1, a length of a period from a time point at which a previous touch coordinate report is output to a time point at which a current touch coordinate report is output. Specifically, when the length of the period from the time point at which the previous touch coordinate report is output to the time point at which the current touch coordinate report is output is t11 and is equal to or less than the determination period ta1, the touch panel controller according to the modified example sets the determination distance to D1. When the length of the period from the time point at which the previous touch coordinate report is output to the time point at which the current touch coordinate report is output is t12 and is greater than the determination period ta1, the touch panel controller sets the determination distance to D2.

(2) The embodiment described above exemplifies the example during the operation of the paint software, but the disclosure is not limited thereto. The contents can also be applied to the disclosure during execution of software other than the paint software, for example, when a gesture action is recognized.

(3) The embodiment described above exemplifies the example in which the rate change notification signal RS is formed as a signal indicating either "High" or "Low", but the disclosure is not limited thereto. For example, the rate change notification signal RS may be formed of a communication signal (a signal by serial communication using an I²C bus or an SPI bus) transmitted from the timing controller 21 to the touch panel controller 22. Further, the touch panel controller 22 may detect, as the rate change notification signal RS, a change in cycle of a pulse signal transmitted to the touch panel controller 22 normally in a regular cycle.

(4) The embodiment described above exemplifies the example in which the refresh rate F is changed between two rates of F1 and F2, but the disclosure is not limited thereto. For example, the refresh rate F may be changed between three or more rates. In this case, a determination distance may be changed so as to be increased when the refresh rate F is changed from a low rate to a high rate.

(5) The embodiment described above exemplifies the example in which the touch positions P1 and P2, or the touch positions P3 and P4 are associated with each other by being provided with the same ID, but the disclosure is not limited thereto. For example, the touch panel controller 22 may generate information indicating that the touch positions P1 and P2 are associated with each other (or the touch positions P3 and P4 are associated with each other).

The in-cell touch panel device and the method for controlling an in-cell touch panel described above can be described as follows.

An in-cell touch panel device according to a first configuration includes: an in-cell touch panel configured to perform display of an image and detection of a touch position in a time division manner; and a control circuit configured to control the in-cell touch panel, in which the control circuit is configured to change a refresh rate of the in-cell touch panel between a first rate and a second rate lower than the first rate, and the control circuit is further configured to cause the in-cell touch panel to perform detection of a touch position in a first cycle when the refresh rate is the first rate, cause the in-cell touch panel to perform detection of a touch position in a second cycle being a cycle longer than the first cycle at the end at least within one frame period, when the refresh rate is the second rate, associate a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle, and associate a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate (first configuration).

According to the first configuration, even when the refresh rate is changed from the second rate to the first rate, and a period from a time point at which the third touch position before the change is detected to a time point at which the fourth touch position is detected is extended, whether the third touch position and the fourth touch position detected before and after the change need to be associated with each other can be determined by using the second determination distance greater than the first determination distance. In this way, whether the third touch position and the fourth touch position need to be associated with each other can be appropriately determined as compared to a case where the first determination distance is used. As a result, even when the refresh rate is changed from the second rate to the first rate, successive touches before and after the change can be appropriately detected.

In the first configuration, the control circuit may include an identification information provision unit configured to provide the same piece of identification information to the third touch position and the fourth touch position when a touch-to-touch distance between the third touch position and the fourth touch position is equal to or less than the second determination distance, and provide different pieces of identification information to the third touch position and the fourth touch position when a touch-to-touch distance between the third touch position and the fourth touch position is greater than the second determination distance (second configuration).

According to the second configuration, whether the third touch position and the fourth touch position are associated with each other can be easily determined by referring to the identification information provided to each of the third touch position and the fourth touch position.

In the second configuration, the control circuit may further include a rate change detection unit configured to detect a change of a refresh rate, and the rate change detection unit may be configured to transmit a rate change signal indicating a change of the refresh rate to the identification information provision unit in response to detection of the change of the refresh rate (third configuration).

According to the third configuration, the change of the refresh rate can be detected even when a function of changing the refresh rate is provided outside the control circuit.

In any one of the first to third configurations, the in-cell touch panel device may further include a refresh rate change unit configured to change a refresh rate of the in-cell touch panel from the second rate to the first rate in response to detection of a touch position performed by the in-cell touch panel when the refresh rate is the second rate (fourth configuration).

According to the fourth configuration, the refresh rate can be increased in response to a touch on the in-cell touch panel. As a result, the refresh rate can be increased as necessary while reducing power consumption by setting the refresh rate to the second rate.

A method for controlling an in-cell touch panel according to a fifth configuration is a method for controlling an in-cell touch panel configured to perform display of an image and detection of a touch position in a time division manner, and includes: changing a refresh rate of the in-cell touch panel between a first rate and a second rate lower than the first rate; causing the in-cell touch panel to perform detection of a touch position in a first cycle when the refresh rate is the first rate; causing the in-cell touch panel to perform detection of a touch position in a second cycle being a cycle longer than the first cycle at the end at least within one frame period, when the refresh rate is the second rate; associating a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle; and associating a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate (fifth configuration).

According to the fifth configuration, similarly to the first configuration described above, even when the refresh rate is changed from the second rate to the first rate, successive touches before and after the change can be appropriately detected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An in-cell touch panel device comprising:
   an in-cell touch panel configured to perform display of an image and detection of a touch position in a time division manner; and
   a control circuit configured to control the in-cell touch panel,
   wherein the control circuit is configured to change a refresh rate of the in-cell touch panel between a first rate and a second rate lower than the first rate, and
   the control circuit is further configured to
   cause the in-cell touch panel to perform detection of a touch position in a first cycle when the refresh rate is the first rate,
   cause the in-cell touch panel to perform detection of a touch position in a second cycle being a cycle longer than the first cycle at the end at least within one frame period, when the refresh rate is the second rate,
   associate a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle, and
   associate a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate.

2. The in-cell touch panel device according to claim 1, wherein the control circuit includes an identification information provision unit configured to provide the same piece of identification information to the third touch position and the fourth touch position when a touch-to-touch distance between the third touch position and the fourth touch position is equal to or less than the second determination distance, and provide different pieces of identification information to the third touch position and the fourth touch position when a touch-to-touch distance between the third touch position and the fourth touch position is greater than the second determination distance.

3. The in-cell touch panel device according to claim 2, wherein the control circuit further includes a rate change detection unit configured to detect a change of a refresh rate, and
   the rate change detection unit is configured to transmit a rate change signal indicating a change of the refresh rate to the identification information provision unit in response to detection of the change of the refresh rate.

4. The in-cell touch panel device according to claim 1, further comprising
   a refresh rate change unit configured to change a refresh rate of the in-cell touch panel from the second rate to the first rate in response to detection of a touch position being performed by the in-cell touch panel when the refresh rate is the second rate.

5. A method for controlling an in-cell touch panel configured to perform display of an image and detection of a touch position in a time division manner, the method comprising:
   changing a refresh rate of the in-cell touch panel between a first rate and a second rate lower than the first rate;
   causing the in-cell touch panel to perform detection of a touch position in a first cycle when the refresh rate is the first rate;
   causing the in-cell touch panel to perform detection of a touch position in a second cycle being a cycle longer than the first cycle at the end at least within one frame period, when the refresh rate is the second rate;
   associating a first touch position and a second touch position with each other when a touch-to-touch distance between the first touch position and the second touch position is equal to or less than a first determination distance, the first touch position and the second touch position being successively detected in a period in which the in-cell touch panel is caused to perform detection of a touch position in the first cycle; and
   associating a third touch position and a fourth touch position with each other when a touch-to-touch distance between the third touch position and the fourth touch position is equal to or less than a second determination distance greater than the first determination distance, the third touch position being detected last in a period in which the refresh rate is the second rate and the fourth touch position being detected first since a period in which the refresh rate is the first rate starts, when the refresh rate is changed from the second rate to the first rate.

* * * * *